(12) United States Patent
Jain et al.

(10) Patent No.: US 9,897,435 B2
(45) Date of Patent: Feb. 20, 2018

(54) INSTALLATION AUXILIARY DEVICE FOR FACILITATING INSTALLATION OF SENSING DEVICE AND METHOD THEREFOR

(71) Applicant: DELTA ELECTRONICS, INC., Taoyuan (TW)

(72) Inventors: Shin-Chung Jain, Taoyuan (TW); Min-Nan Liao, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 138 days.

(21) Appl. No.: 15/137,210

(22) Filed: Apr. 25, 2016

(65) Prior Publication Data
US 2017/0205226 A1 Jul. 20, 2017

(51) Int. Cl.
G01B 11/14 (2006.01)

(52) U.S. Cl.
CPC .................................... *G01B 11/14* (2013.01)

(58) Field of Classification Search
CPC ...................................................... G01B 11/14
USPC .................................................. 33/286, 290
See application file for complete search history.

(56) References Cited

U.S. PATENT DOCUMENTS

| | | | |
|---|---|---|---|
| 5,539,990 A * | 7/1996 | Le | G01C 15/004 33/281 |
| 6,931,739 B2 * | 8/2005 | Chang | G01C 15/004 33/283 |
| 6,999,217 B2 * | 2/2006 | Chang | H04N 1/207 359/223.1 |
| 2006/0070251 A1 * | 4/2006 | Wu | G01C 15/004 33/286 |
| 2006/0179672 A1 * | 8/2006 | Tacklind | G01C 15/004 33/286 |
| 2008/0276473 A1 * | 11/2008 | Raschella | F41G 1/35 33/286 |
| 2012/0234805 A1 * | 9/2012 | Schwarz | B23K 26/03 219/121.63 |
| 2013/0097880 A1 * | 4/2013 | Wernig | H01Q 3/005 33/228 |
| 2014/0226167 A1 * | 8/2014 | Smith | G03B 21/14 356/614 |
| 2017/0003393 A1 * | 1/2017 | Monks | F01D 21/003 |
| 2017/0185157 A1 * | 6/2017 | Delfs | G06F 3/017 |
| 2017/0289451 A1 * | 10/2017 | Wittenberg | H04N 5/23245 |

* cited by examiner

*Primary Examiner* — G. Bradley Bennett (57) ABSTRACT

An auxiliary device for facilitating the installation of a sensing device and a method therefor are disclosed, and the installation support device includes a main body, a first light source assembly and a second light source assembly. The main body has a clamping mechanism configured for mounting the main body onto the sensing device, the first light source assembly and the second light source assembly are disposed on the main body and has at least one solid state light source, and the first light source assembly projects a first pattern along a first projecting direction, and the second light source assembly projects a second pattern along a second projecting direction. The two projecting directions are crossed each other at a predetermined distance, and whether the sensing device is installed at a desired position is determined according to a relative position between the first pattern and the second pattern.

11 Claims, 10 Drawing Sheets

INSTALLATION AUXILIARY DEVICE FOR FACILITATING INSTALLATION OF SENSING DEVICE AND METHOD THEREFOR

FIELD OF THE INVENTION

The present invention relates to an installation auxiliary device, and more particularly to an installation auxiliary device for facilitating the installation of a sensing device and a method therefor.

BACKGROUND OF THE INVENTION

Recently, various kinds of sensing devices, such as infrared sensing devices, thermo sensing devices, are employed to perform the environment detection and form vital components of security, automated lighting control, home control, energy efficiency, and other useful systems. These sensing devices need to be installed at appropriate locations so as to detect the predetermined area within the appropriate distance.

Nowadays, when a sensing device is installed, the sensing distance and the sensing range of the sensing device are usually measured manually and indirectly, for example, by using a laser range finder and analyzing the results. The sensing range of the sensing device is an area, however, the laser range finder can only measure the distance between two points and calculate the angle. Thus, if the laser range finder is used for helping the installation of the sensing device, it will need comprehensive calculations to know where the sensing range is.

On the other hand, some light devices, such as LED lighting devices, stage laser lighting devices, capable of projecting patterns are employed to determine whether the sensing device is positioned at appropriate location. However, the above-mentioned light devices can only project patterns. One can determine whether a sensing device is positioned at an appropriate location by comparing the focal length and the position of the pattern-projectable device, and then determining whether the projected patterns are clear or not. However, determinations of clarities of the patterns differ from people to people, and there isn't a standard of judgment. Further, such method cannot directly determine the sensing distance and the sensing range of the sensing device.

In other words, most methods in the prior arts are manually measuring the sensing distance, and then calculate the sensing range. Besides, if the sensing device is installed obliquely, using the laser range finder for calculating the sensing range will become more complicated.

Since the methods in the prior arts are indirectly determining the sensing range, the installations of sensing devices are usually very complicate and inconvenient.

Therefore, there is a need of providing an installation auxiliary device for facilitating the installation of a sensing device and a method therefor so as to obviate the drawbacks encountered from the prior arts.

SUMMARY OF THE INVENTION

It is an object of the present invention to provide an installation auxiliary device for enabling a technician to directly determine whether a sensing device is positioned at a desired location, thereby simplifying the installation.

In accordance with an aspect of the present invention, an auxiliary device for facilitating the installation of a sensing device is provided. The installation support device includes a main body, a first light source assembly and a second light source assembly. The main body has a clamping mechanism configured for mounting the main body onto the sensing device. The first light source assembly is disposed on the main body and has at least one solid state light source, and the first light source assembly projects a first pattern along a first projecting direction. The second light source assembly is disposed on the main body and has at least one solid state light source, and the second light source assembly projects a second pattern along a second projecting direction. The first projecting direction and the second projecting direction are crossed each other at a predetermined distance, and whether the sensing device is installed at a desired position is determined according to a relative position between the first pattern and the second pattern.

In accordance with another aspect of the present invention, a method for adjusting a sensing distance and a sensing range of a sensing device by using an installation auxiliary device is provided. The method includes the following steps: (a) allowing the first light source assembly to project a first pattern along a first projecting direction and the second light source assembly to project a second pattern along a second projecting direction, wherein the first projecting direction and the second projecting direction are crossed each other at a predetermined distance; (b) analyzing a relative position between the first pattern and the second pattern; (c) determining whether the first pattern and the second pattern overlap each other and have the same size, wherein if the result is true, the sensing distance is the same as the predetermined distance and the sensing range is the same as a range covered by the first pattern and the second pattern, and the installation of the sensing device is performed; (d) if the result of step (c) is false, then determining whether the first pattern is larger than the second pattern and covers the second pattern, wherein if the result is true, the sensing distance exceeds the predetermined distance and the position of the sensing device is adjusted for shortening the distance between the sensing device and the ground, after that, back to the step (b); (e) if the result of step (d) is false, the sensing distance is within the predetermined distance, then determining whether a shorter sensing distance and a narrower sensing range are acceptable, wherein if the result is true, the installation of the sensing device is performed; and (f) if the result of step (e) is false, the position of the sensing device is adjusted for lengthening the distance between the sensing device and the ground, after that, back to the step (b) and repeating the steps (b) to (f) until the installation of the sensing device is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
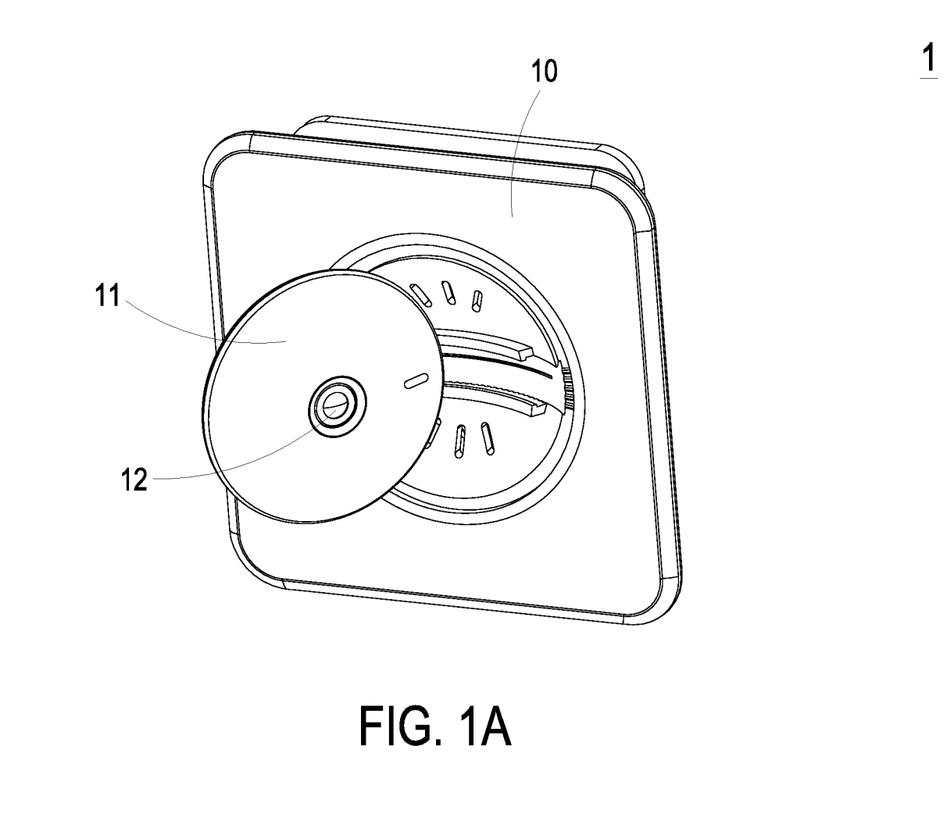
FIG. 1A is a schematic perspective view illustrating the structure of a sensing device.
Figure 1B:
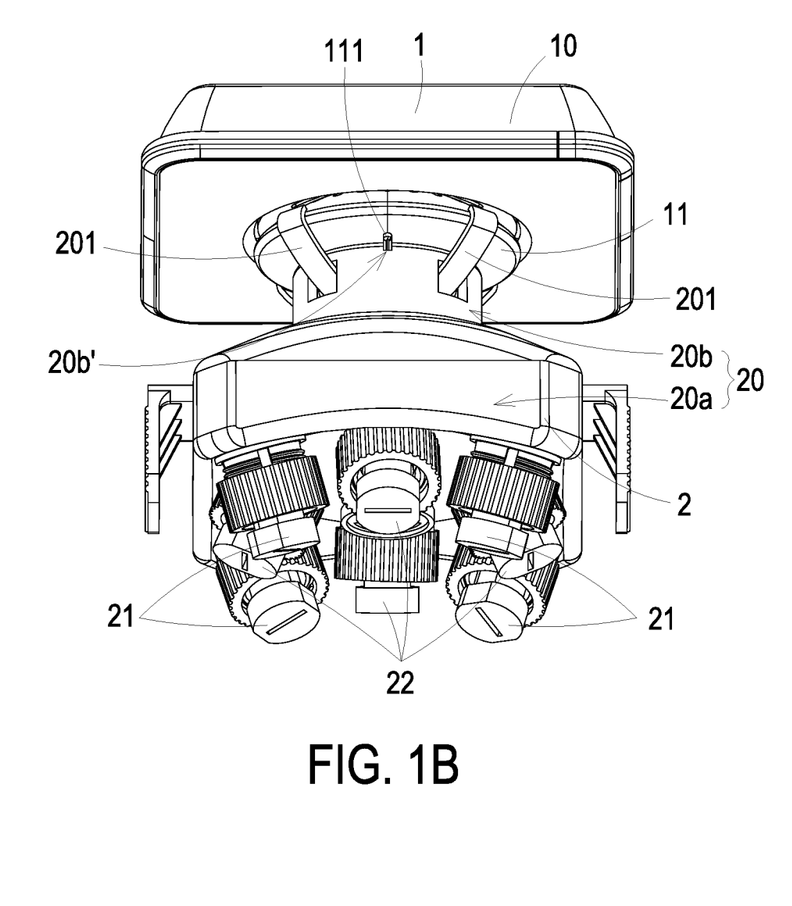
FIG. 1B is a schematic perspective view illustrating the structure when the installation auxiliary device of the present invention is mounted on the sensing device.
Figure 5:
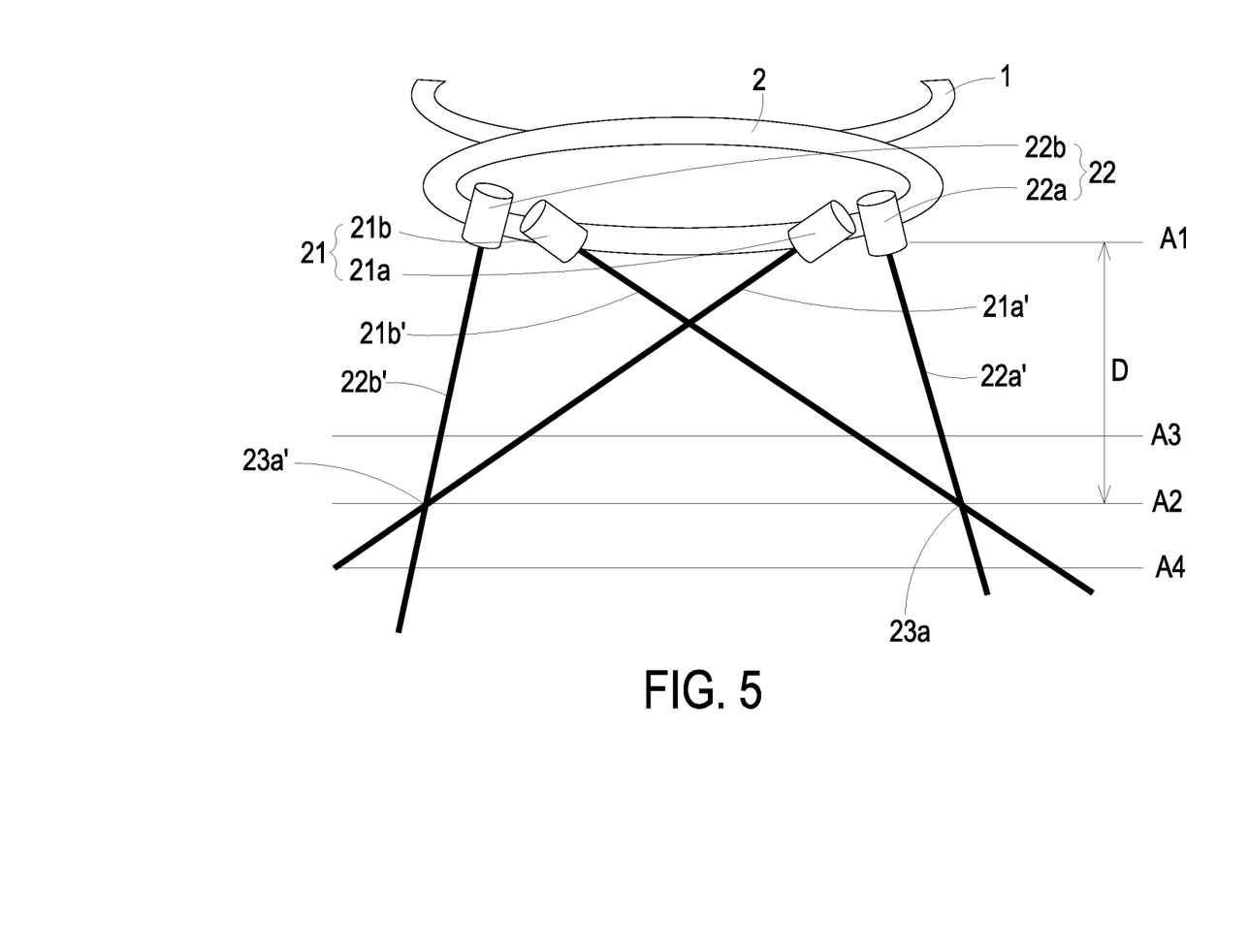
FIG. 5 is a schematic view illustrating the beams projected from the installation auxiliary device according to the first embodiment of the present invention.
Figure 6A:
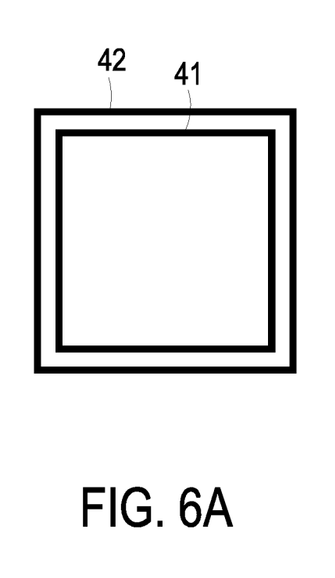
FIG. 6A is a schematic view illustrating the status when the projected first pattern is larger than and covers the projected second pattern according to the first embodiment of the present invention.

FIG. 1A is a schematic perspective view illustrating the structure of a sensing device. FIG. 1B is a schematic perspective view illustrating the structure when the installation auxiliary device of the present invention is mounted on the sensing device. As show in FIGS. 1A and 1B, the installation auxiliary device 2 is used for facilitating the installation of a sensing device 1. The sensing device 1 includes a base 10, a sensing module 11 and a sensing element 12. The sensing element 12 is disposed on the sensing module 11, and the sensing module 11 is movably mounted on the base 10. The installation auxiliary device 2 includes a main body 20, a first light source assembly 21 and a second light source assembly 22. The main body 20 is shaped as but not limited to a column 20b that a platform 20a is connected with one side of the column 20b. The main body 20 includes a clamping mechanism 201 configured for mounting the main body 20 onto the sensing device 1. The first light source assembly 21 and the second light source assembly 22 are disposed on the platform 20a of the main body 20 and have at least one solid state light source, respectively. The first light source assembly 21 projects a first pattern 41 (as shown in FIG. 6A) along a first projecting direction and the second light source assembly 22 projects a second pattern 42 (as shown in FIG. 6A) along a second projecting direction. The first projecting direction and the second projecting direction are crossed each other at a predetermined distance D (as shown in FIG. 5), and whether the sensing device 1 is installed at a desired location is determined according to a relative position between the first pattern and the second pattern. Besides, when the first pattern 41 and the second pattern 42 overlap each other and have the same size, the sensing distance of the sensing device 1 is the same as the predetermined distance D, and a sensing range of the sensing device 1 is the same as a range covered by the first pattern 41 and the second pattern 42.

In this embodiment, preferably but not exclusively, the main body 20 of the installation auxiliary device 2 further includes a slot 20b' disposed on the column 20b of the main body 20, and the sensing device 1 further includes a protruding rib 111 disposed on the sensing module 11 of the sensing device 1. The protruding rib 111 is configured to engage with the slot 20b' of the installation auxiliary device 2 correspondingly, and the relative position between the installation auxiliary device 2 and the sensing device 1 is fixed, so that the projecting directions of the first light source assembly 21 and the second light source assembly 22 are corresponding to the sensing element 12. Consequently, the installation of sensing device 1 can be performed by using the installation auxiliary device 2. It is noted that the number and shape of the protruding rib 111 and the slot 20b' as described above are only to explain the invention, if one of two structures can correspondingly engage with the other one, no matter what shapes or numbers they are, it should be covered by the present invention.

Figure 2:
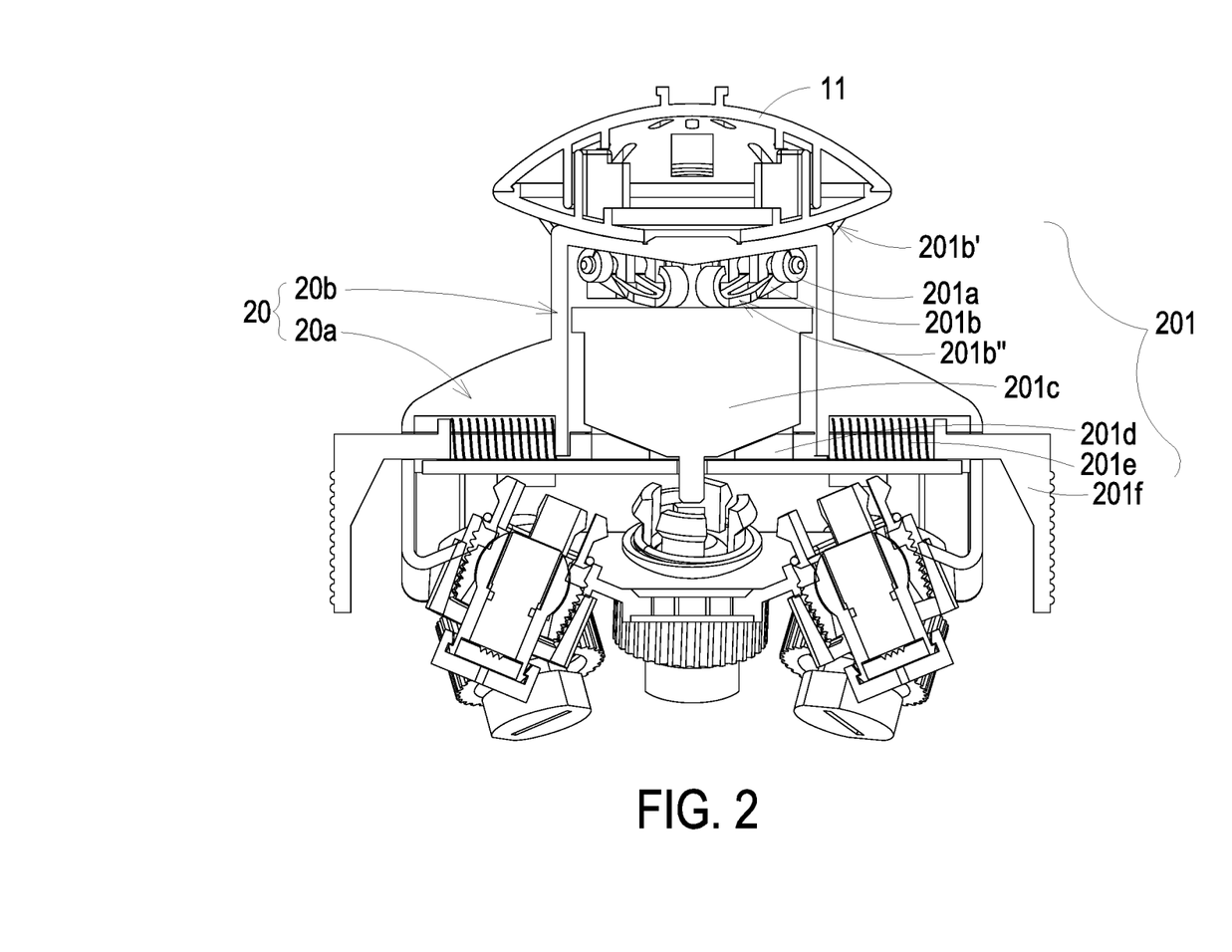
FIG. 2 is a cross-sectional view illustrating the structure when the installation auxiliary device of the present invention is mounted on the sensing device.

The following describes the operation of the clamping mechanism 201. FIG. 2 is a cross-sectional view illustrating the structure when the installation auxiliary device of the present invention is mounted on the sensing device. As shown in FIG. 2, in this embodiment, the clamping mechanism 201 includes a plurality of shafts 201a, a plurality of arms 201b, a block 201c, a plurality of resisting element 201d, a plurality of elastic elements 201e and a plurality of push elements 201f, and these elements are all disposed within an accommodation space (not shown) of the main body 20. The arm 201b is connected to the shaft 201a at the middle point thereof, so that the shaft 201a can be served as a pivot for allowing the arm 201b to rotate there around. Besides, a clamping end 201b' and a resisting end 201b" are defined at two ends of the arm 201b, the clamping end 201b' is extended outwardly from the column 20b of the main body 20 for clamping the outer edge of the sensing module 11 to perform a clamping action. The resisting end 201b" and the shaft 201a are disposed within the accommodation space of the column 20b of the main body 20, and the resisting end 201b" abuts against the block 201c. The two sides of the resisting element 201d abut against an oblique surface on the bottom of the block 201c and the push element 201f, respectively. The elastic element 201e is sleeved around one end of the push element 201f and used for restoring the position of the push element 201f.

After the installation of the sensing device 1 is performed, the installation auxiliary device 2 can be detached from the sensing device 1. When the installation auxiliary device 2 is detached, the user can push the push element 201f. Meanwhile, the elastic element 201e is compressed by the push element 201f, the push element 201f abuts against the resisting element 201d, and the resisting element 201d abuts against the oblique surface on the bottom of the block 201c. Under this circumstance, the resisting element 201d transfers an upward force from the oblique surface to the block 201c and pushes the block 201c upwardly. Then the block 201c pushes the resisting end 201b" of the arm 201b, and the clamping end 201b' rotates. Consequently, the clamping end 201b' is released from the outer edge of the sensing module 11. Moreover, after the clamping mechanism 201 is released and the user releases the push element 201f, the elastic element 201e restores its original shape and the push element 201f is returned to the initial position. The operation of mounting the installation auxiliary device 2 onto the sensing device 1 is the same as that of releasing the installation auxiliary device 2 from the sensing device 1 described above, and it's not described herein redundantly.

Figure 3A:
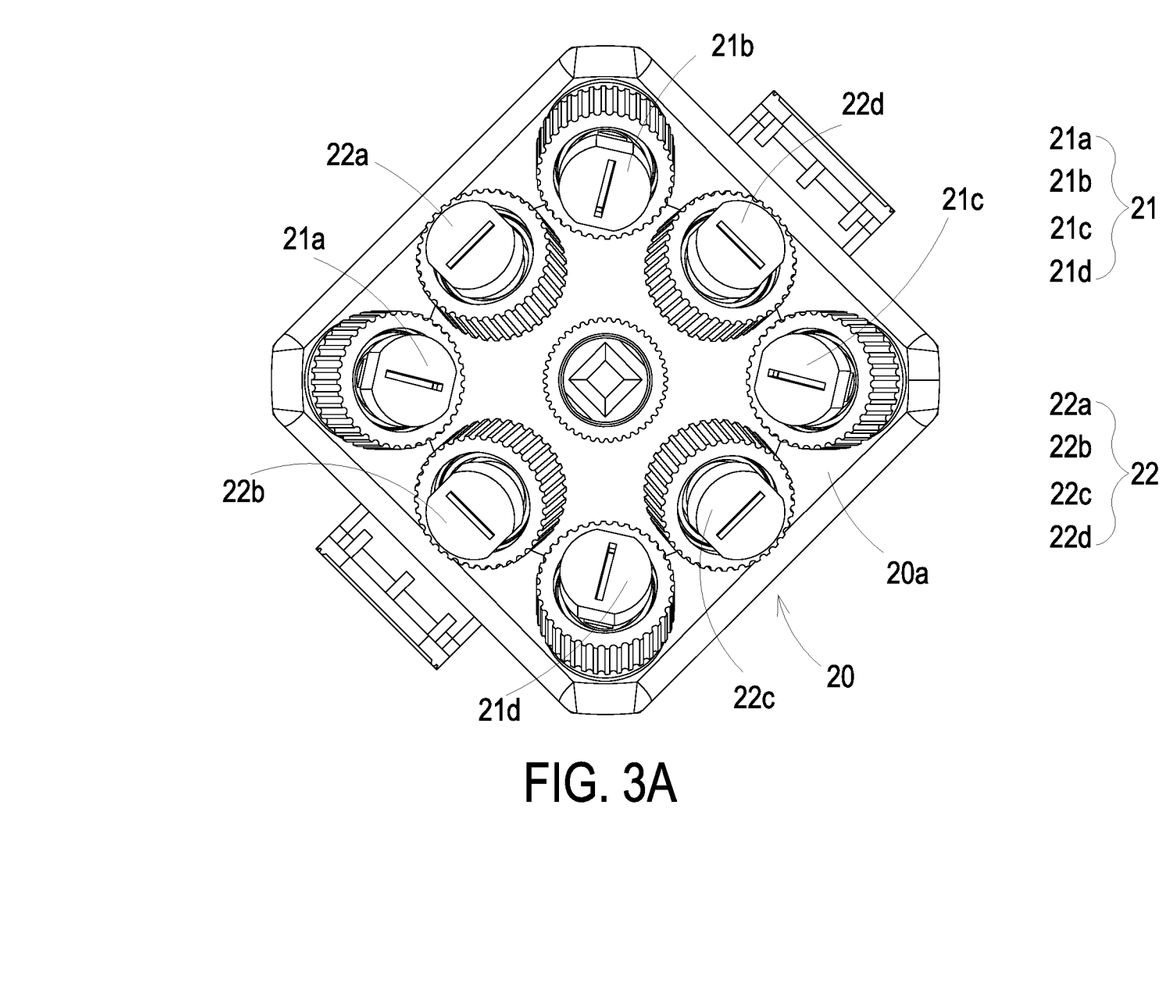
FIG. 3A is a bottom view illustrating the installation auxiliary device according to the first embodiment of the present invention.
Figure 3B:
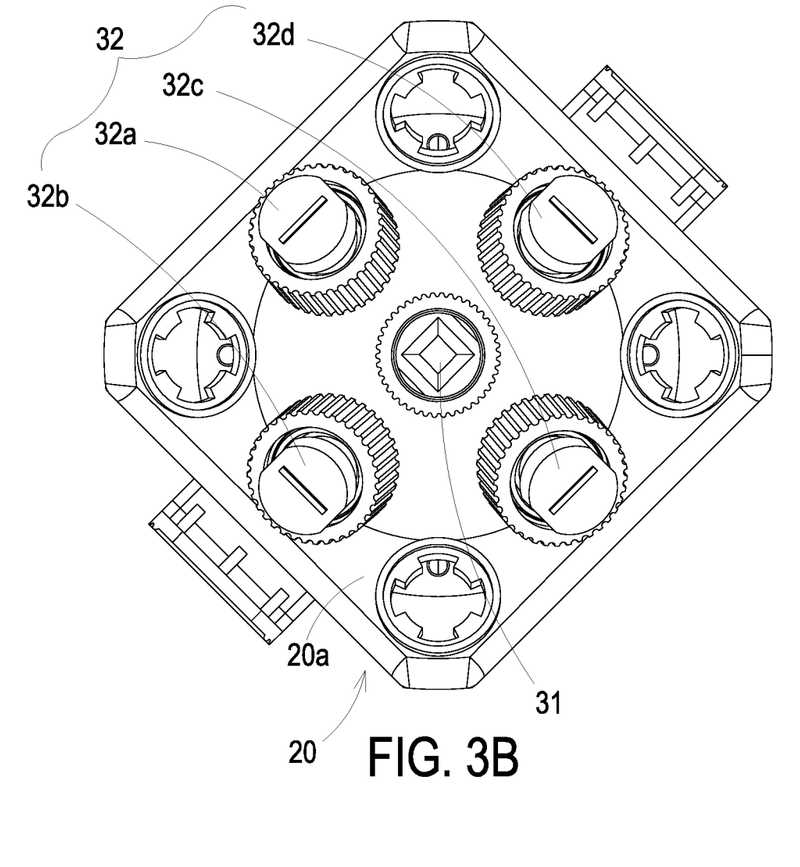
FIG. 3B is a bottom view illustrating the installation auxiliary device according to the second embodiment of the present invention.

FIG. 3A is a bottom view illustrating the installation auxiliary device according to the first embodiment of the present invention. FIG. 3B is a bottom view illustrating the installation auxiliary device according to the second embodiment of the present invention. As shown in FIGS. 3A and 3B, the first light source assembly 21, 31 and the second light source assembly 22, 32 are disposed on the platform 20a of the main body 20. According to the first embodiment, as shown in FIG. 3A, the first light source assembly 21 includes four solid state light sources 21a, 21b, 21c and 21d, the second light source assembly 22 also includes four solid state light sources 22a, 22b, 22c and 22d, and the beams projected from the solid state light sources 21a, 21b, 21c, 21d, 22a, 22b, 22c and 22d of the first light source assembly 21 and second light source assembly 22 are composed of solid linear lines, and the beam colors of the first light source assembly 21 and second light source assembly 22 are different. Alternatively, the projected beams can be composed of dotted lines. The linear lines projected from the first light source assembly 21 form a first pattern 41 (as shown in FIG. 6A), and the linear lines projected from the second light source assembly 22 form a second pattern 42 (as shown in FIG. 6A). Preferably but not exclusively, the first pattern 41 and the second pattern 42 are quadrangle.

According to the second embodiment of the present invention, as shown in FIG. 3B, the first light source assembly 31 includes a solid state light source 31a and the solid state light source 31a is covered by a photo mask (not illustrated), so that the first light source assembly 31 can directly project the first pattern 41. The second light source assembly 32 includes four solid state light sources 32a, 32b, 32c and 32d. The beams projected from the solid state light sources 32a, 32b, 32c and 32d of the second light source assembly 32 can be composed of dotted line or solid line. Consequently, the first light source assembly 31 directly projects the first pattern 41, and the beams projected from the second light source assembly 32 form a second pattern 42. Preferably but not exclusively, the first pattern 41 and the second pattern 42 are one of quadrangle, circle and triangle.

Figure 7A:
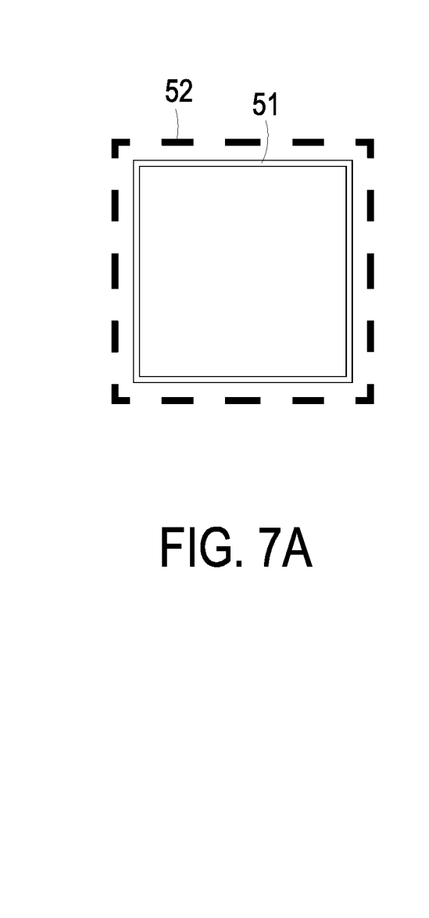
FIG. 7A is a schematic view illustrating the status when the projected first pattern is larger than and covers the projected second pattern according to the second embodiment of the present invention.
Figure 7B:
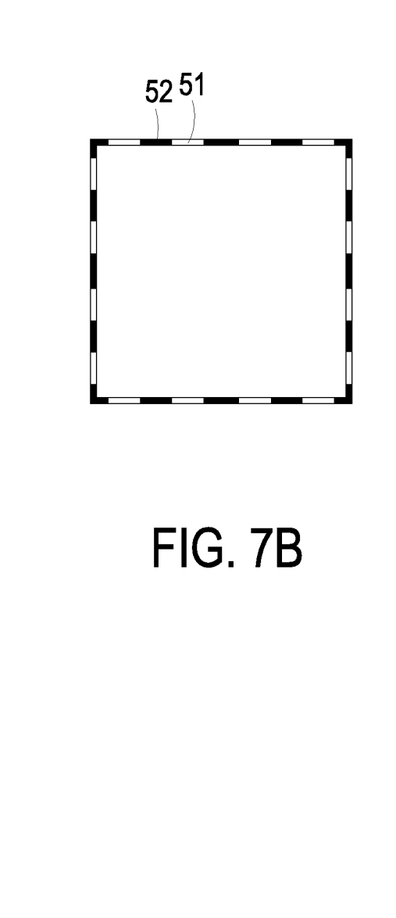
FIG. 7B is a schematic view illustrating the status when the projected first pattern and the projected second pattern are in an overlap relation according to the second embodiment of the present invention.
Figure 7C:
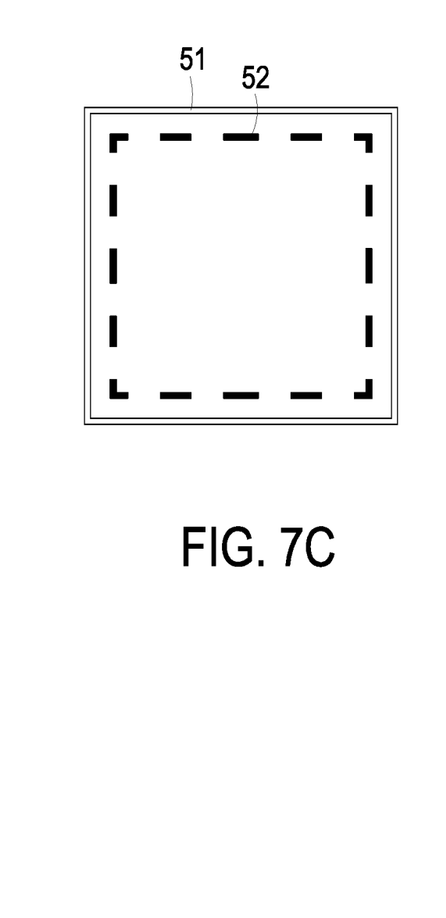
FIG. 7C is a schematic view illustrating the status when the projected second pattern is larger than and covers the projected first pattern according to the second embodiment of the present invention.

The following describes the embodiment which the projected beams are dotted lines. FIG. 7A is a schematic view illustrating the status when the projected first pattern is larger than and covers the projected second pattern according to the second embodiment of the present invention. FIG. 7B is a schematic view illustrating the status when the projected first pattern and the projected second pattern are in an overlap relation according to the second embodiment of the present invention. FIG. 7C is a schematic view illustrating the status when the projected second pattern is larger than and covers the projected first pattern according to the second embodiment of the present invention. As shown in FIGS. 7A to 7C, preferably but not exclusively, the first pattern 51 is composed of solid lines, and the second pattern 52 is composed of dotted lines. In other embodiments, the colors of the first pattern 51 and the second pattern 52 are different from each other, so that the users can distinguish the patterns easily. It is noted that the first light source assembly 21, 31 and the second light source assembly 22, 32 are employed to project patterns, and the number of solid state light source, the color of the projected beams and the shape of projected patterns can be varied according to the practical requirements.

Figure 4A:
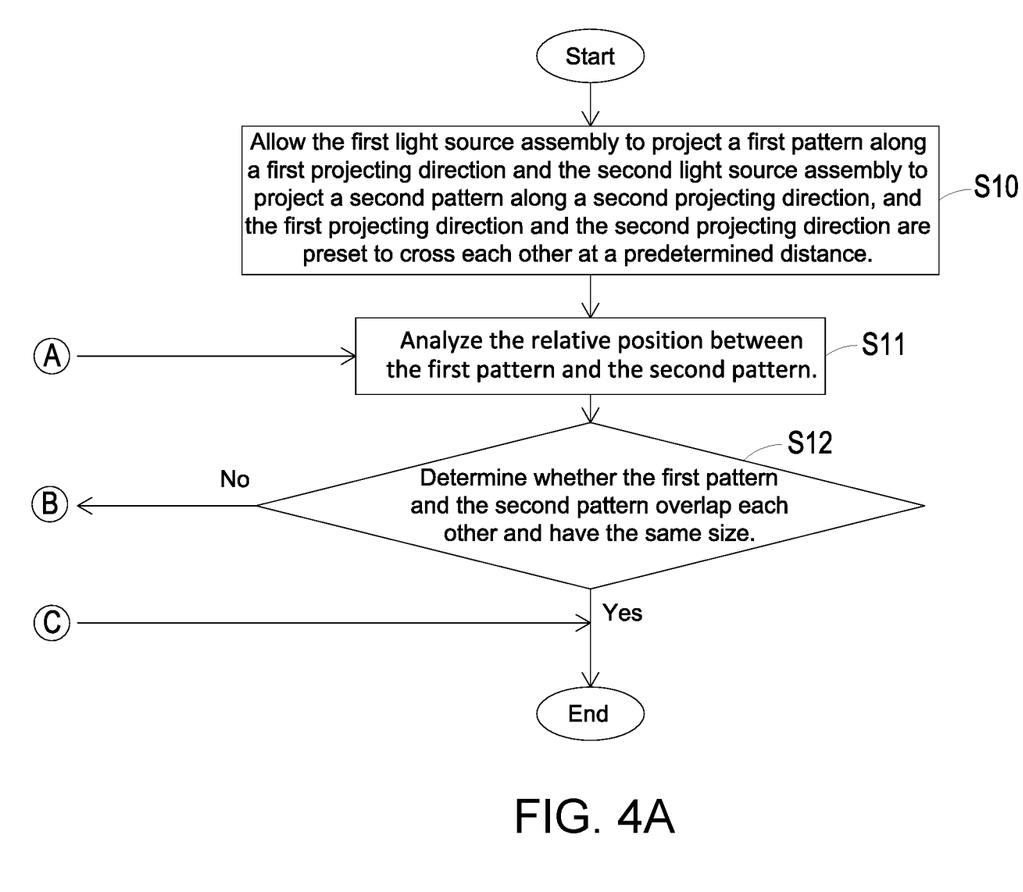
FIGS. 4A and 4B combined show a flow chart illustrating the method for adjusting a sensing distance and a sensing range of the sensing device by using the installation auxiliary device.
Figure 4B:
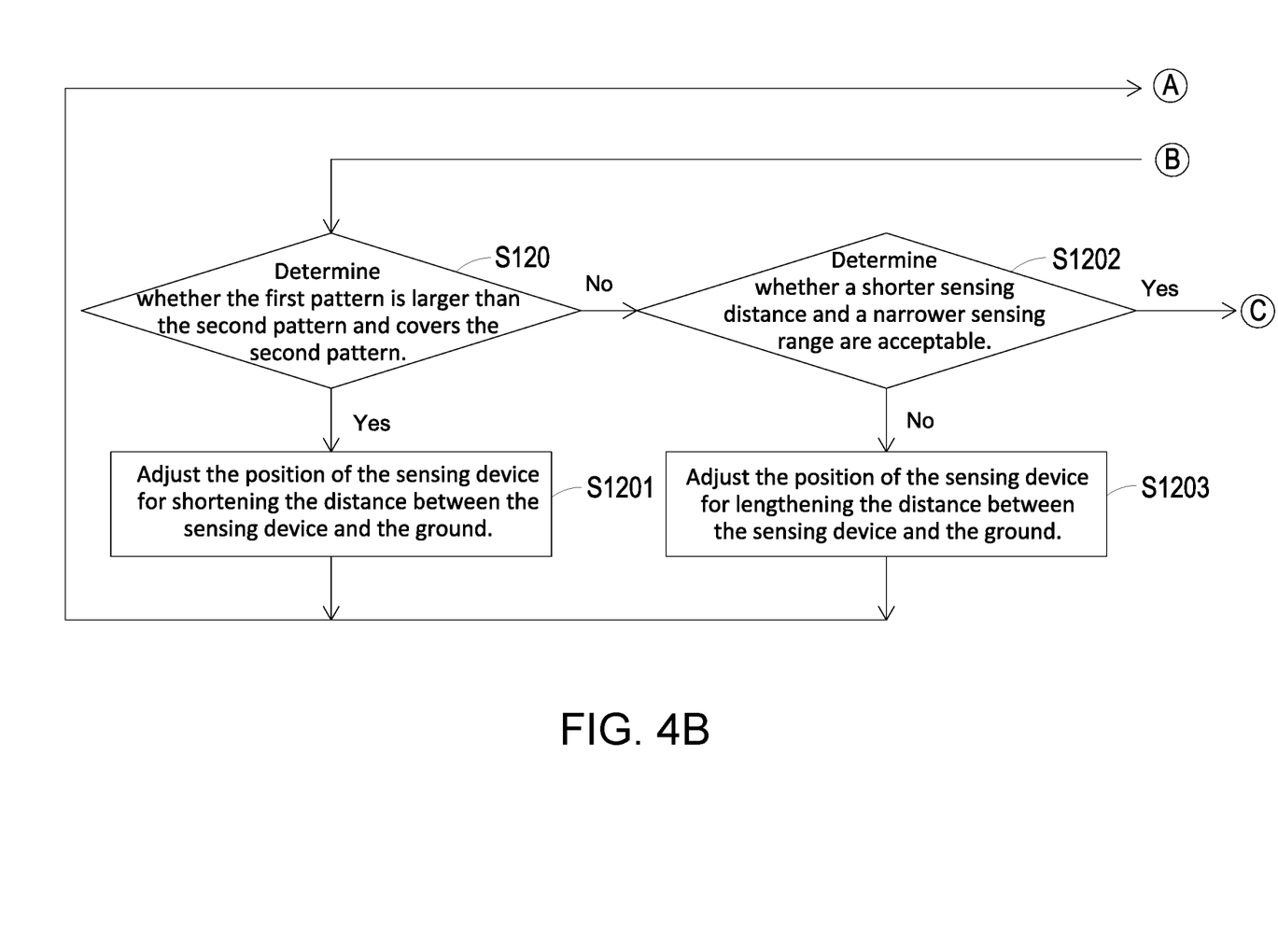

The following describes the method for adjusting a sensing distance and a sensing range of a sensing device by using an installation auxiliary device of the present invention. FIGS. 4A and 4B combined show a flow chart illustrating the method for adjusting a sensing distance and a sensing range of the sensing device by using the installation auxiliary device. As shown in FIGS. 1A, 1B, 4A, and 4B, the installation auxiliary device 2 is detachably mounted on the sensing module 11 of the sensing device 1 by the clamping mechanism 201 of the installation auxiliary device 2. Then, the method for adjusting a sensing distance and a sensing range of the sensing device 1 by using the installation auxiliary device 2 is performed. The method includes the following steps. Firstly, the first light source assembly 21 (as shown in FIG. 3A) is enabled to project a first pattern 41 (as shown in FIG. 6A) along a first projecting direction and the second light source assembly 42 (as shown in FIG. 3A) is enabled to project a second pattern 42 (as shown in FIG. 6A) along a second projecting direction (see step S10). In this embodiment, the first pattern 41 along the first projecting direction and the second pattern 42 along the second projecting direction are preset to cross each other at a predetermined distance D (as shown in FIG. 5). Then, analyze a relative position between the first pattern 41 and the second pattern 42 (see step S11). Thereafter, determine whether the first pattern 41 and the second pattern 42 overlap each other and have the same size (see step S12). If the result is true, the sensing distance is the same as the predetermined distance D and the sensing range is the same as a range covered by the first pattern 41 and the second pattern 42, and the installation of the sensing device 1 is performed. If the result is false, then the step S120 is performed to determine whether the first pattern 41 is larger than the second pattern 42 and covers the second pattern 42. If the result is true, the sensing distance exceeds the predetermined distance and the position of the sensing device 1 is adjusted for shortening the distance between the sensing device 1 and the ground (see S1201). After that, back to the step S11. If the result of step S120 is false, the sensing distance is within the predetermined distance, and then determine whether a shorter sensing distance and a narrower sensing range are acceptable (see step S1202). If the result is true, the installation of the sensing device 1 is performed. In addition, if the result of step S120 is false, the position of the sensing device 1 is adjusted for lengthening the distance between the sensing device 1 and the ground (see step S1203). After that, back to the step S11 and repeat the steps S11 to S1203 until the installation of the sensing device 1 is performed.

FIG. 5 is a schematic view illustrating the beams projected from the installation auxiliary device according to the first embodiment of the present invention. It is noted that only four solid state light sources 21a, 21b, 22a, and 22b of the first light source assembly 21 and the second light source assembly 22 are shown in FIG. 5 for easily describing the present invention. As shown in FIG. 5, the solid state light sources 21a, 21b of the first light source assembly 21 project beams 21a', 21b' along a first projecting direction, and the solid state light sources 22a, 22b project beams 22a', 22b' along a second projecting direction, and the first projecting direction and the second projecting direction are preset to cross each other at a predetermined distance D. In other words, the beam 21b' projected from the solid state light source 21b of the first light source assembly 21 crosses the beam 22a' projected from the solid state light source 22a of the second light source assembly 22 at the intersection point 23a, and the beam 21a' projected from the solid state light source 21a of the first light source assembly 21 crosses the beam 22b' projected from the solid state light source 22b of the second light source assembly 22 at the intersection point 23a'. It is noted that the FIG. 5 only shows two sides of the installation auxiliary device 2, the other sides of the installation auxiliary device 2 also project beams in the same way. Consequently, the beams projected from the first light source assembly 21 form the first pattern 41 (as shown in FIG. 6A), and the beams projected from the second light source assembly 22 form the second patter 42 (as shown in FIG. 6A). A first plane A1 is defined by the solid state light sources disposed on the installation auxiliary device 2, and a second surface A2 is defined by an extending plane of the intersection points 23a, 23a'. By adjusting the first projecting direction of the first light source assembly 21 and the second projecting direction of the second light source assembly 22, the distance between the first surface A1 and the second surface A2 can be adjusted to the preferable sensing distance (i.e. the predetermined distance D) of the sensing device 1. Consequently, the user can determine whether the sensing device 1 is installed at an appropriate or desired position according to a relative position between the first pattern 41 and the second pattern 42. The details are described below.

Figure 6B:
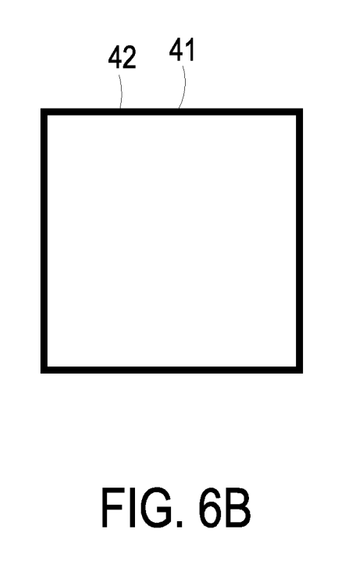
FIG. 6B is a schematic view illustrating the status when the projected first pattern and the projected second pattern are in an overlap relation according the first embodiment of the present invention.
Figure 6C:
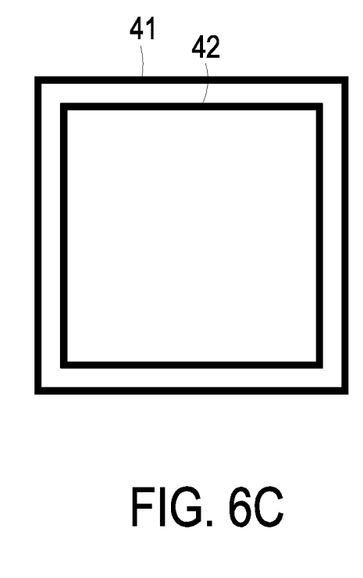
FIG. 6C is a schematic view illustrating the status when the projected second pattern is larger than and covers the projected first pattern according to the first embodiment of the present invention.

FIG. 6A is a schematic view illustrating the status when the projected first pattern is larger than and covers the projected second pattern according to the first embodiment of the present invention. FIG. 6B is a schematic view illustrating the status when the projected first pattern and the projected second pattern are in an overlap relation according to the first embodiment of the present invention. FIG. 6C is a schematic view illustrating the status when the projected second pattern is larger than and covers the projected first pattern according to the first embodiment of the present invention. It is noted that the first projecting direction and the second projecting direction of the installation auxiliary device 2 are adjusted and preset to cross each other at the predetermined distance D (i.e. the preferable sensing distance of the sensing device 1) in advance.

As shown in FIGS. 5, 6A, 6B and 6C, during the installation of the sensing device 1 by using the installation auxiliary device 2, if the vertical distance between the installation auxiliary device 2 and the ground is shorter than the predetermined distance D (i.e. the first surface A3 is served as the ground), the relative position and the sizes of first pattern 41 projected from the first light source assembly 21 and the second pattern 42 projected from the second light source assembly 22 are shown in FIG. 6A. Under this circumstance, the second pattern 42 is larger than and covers the first pattern 41. As shown in FIG. 5, the vertical distance between the installation auxiliary device 2 and the ground is within the predetermined distance D, thus, the installation of the sensing device 1 is performed.

If the vertical distance between the installation auxiliary device 2 and the ground is the same as the predetermined distance D (i.e., the second surface A2 is served as the ground), the relative position and the sizes of first pattern 41 projected from the first light source assembly 21 and the second pattern 42 projected from the second light source assembly 22 are shown in FIG. 6B. Under this circumstance, the size of the first pattern 41 is the same as that of the second pattern 42, and the four sides of the first pattern 41 are all overlap the four sides of the second pattern 42. As shown in FIG. 5, the vertical distance between the installation auxiliary device 2 and the ground is the same as the predetermined distance D, thus, the installation of the sensing device is performed, and the sensing range of the sensing device 1 is the same as the range covered by the first pattern 41 and the second pattern 42.

If the vertical distance between the installation auxiliary device 2 and the ground is longer than the predetermined distance D (i.e. the fourth surface A4 is served as the ground), the relative position and the sizes of first pattern 41 projected from the first light source assembly 21 and the second pattern 42 projected from the second light source assembly 22 are shown in FIG. 6C. Under this circumstance, the first pattern 41 is larger than and covers the second pattern 42. As shown in FIG. 5, the vertical distance between the installation auxiliary device 2 and the ground excesses the predetermined distance D, thus, the sensing device 1 fails to be installed at an appropriate or desired position, and the position of the sensing device 1 should be appropriately adjusted. Consequently, the users can directly determine whether the sensing device 1 is installed at an appropriate position according to the relative position of the first pattern 41 and the second pattern 42.

In conclusion, the installation auxiliary device of the present invent utilizes a first light source assembly to project a first pattern along a first direction and a second light source assembly to project a second pattern along a second direction, and sets the first direction and the second direction to cross each other at a predetermined distance. By further utilizing the principle that the relative position between the first pattern and the second pattern varies with the distance between the installation auxiliary device and the ground, the installation auxiliary device of the present invent can help the user to directly determine whether the sensing device is installed at an appropriate or desired position. Besides, when the first pattern and the second pattern overlap each other, the range covered by the first pattern and the second pattern is the same as the sensing range of the sensing device, that is, the sensing range and the sensing distance of the sensing device is visualized. Thus, the installation of the sensing device can be simplified by using the installation auxiliary device of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An installation auxiliary device for facilitating an installation of a sensing device, the installation auxiliary device comprising:
    a main body having a clamping mechanism configured for mounting the main body onto the sensing device;
    a first light source assembly disposed on the main body and the first light source assembly having at least one solid state light source, wherein the first light source assembly projects a first pattern along a first projecting direction; and
    a second light source assembly disposed on the main body and the second light source assembly having at least one solid state light source, wherein the second light source assembly projects a second pattern along a second projecting direction; wherein the first projecting direction and the second projecting direction are crossed each other at a predetermined distance, and whether the sensing device is installed at a desired position is determined according to a relative position between the first pattern and the second pattern.

2. The installation auxiliary device according to claim 1, wherein the first pattern and the second pattern overlap each other and have the same size, the sensing distance is the same as the predetermined distance, and a sensing range of the sensing device is the same as a range covered by the first pattern and the second pattern.

3. The installation auxiliary device according to claim 1, wherein the main body comprises a slot corresponding to a protruding rib of the sensing device and engaging with the protruding rib so as to fix the position between the installation auxiliary device and the sensing device.

4. The installation auxiliary device according to claim 1, wherein the first pattern and the second pattern are composed of dotted lines.

5. The installation auxiliary device according to claim 1, wherein the first pattern and the second pattern are one of quadrangle, circle and triangle.

6. The installation auxiliary device according to claim 1, wherein the first light source assembly comprises four solid state light sources, and the second light source assembly comprises four solid state light sources.

7. The installation auxiliary device according to claim 1, wherein the first light source assembly comprises one solid state light source and a photo mask disposed thereon, and the second light source assembly comprises four solid state light sources.

8. A method for adjusting a sensing distance and a sensing range of a sensing device by using an installation auxiliary device, wherein the installation auxiliary device is detachably mounted on the sensing device and comprises a main body, a first light source assembly and a second light source assembly, and the first light source assembly and the second light source assembly are disposed on the main body, the method comprising the following steps:

(a) allowing the first light source assembly to project a first pattern along a first projecting direction and the second light source assembly to project a second pattern along a second projecting direction, wherein the first projecting direction and the second projecting direction are crossed each other at a predetermined distance;

(b) analyzing a relative position between the first pattern and the second pattern;

(c) determining whether the first pattern and the second pattern overlap each other and have the same size, wherein if the result is true, the sensing distance is the same as the predetermined distance and the sensing range is the same as a range covered by the first pattern and the second pattern, and the installation of the sensing device is performed;

(d) if the result of step (c) is false, then determining whether the first pattern is larger than the second pattern and covers the second pattern, wherein if the result is true, the sensing distance exceeds the predetermined distance and the position of the sensing device is adjusted for shortening the distance between the sensing device and the ground, after that, back to the step (b);

(e) if the result of step (d) is false, the sensing distance is within the predetermined distance, then determining whether a shorter sensing distance and a narrower sensing range are acceptable, wherein if the result is true, the installation of the sensing device is performed; and (f) if the result of step (e) is false, the position of the sensing device is adjusted for lengthening the distance between the sensing device and the ground, after that, back to the step (b) and repeating the steps (b) to (f) until the installation of the sensing device is performed.

9. The method according to claim 8, wherein the first pattern and the second pattern are one of quadrangle, circle and triangle.

10. The method according to claim 8, wherein the colors of the beams projected from the first light source assembly and the second light source assembly are different.

11. The method according to claim 8, wherein the first pattern and the second pattern are composed of dotted lines.

\* \* \* \* \*